(12) United States Patent
Belmon

(10) Patent No.: US 8,176,536 B2
(45) Date of Patent: May 8, 2012

(54) NETWORK SYSTEMS AND METHODS FOR PROVIDING GUEST ACCESS

(75) Inventor: Stephane Belmon, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1358 days.

(21) Appl. No.: 11/742,279

(22) Filed: Apr. 30, 2007

(65) Prior Publication Data

US 2008/0267195 A1  Oct. 30, 2008

(51) Int. Cl.
*H04L 29/06* (2006.01)

(52) U.S. Cl. ............ 726/7; 370/401; 370/331; 370/332; 370/333; 370/334; 370/338; 370/400; 725/25; 709/221; 709/228; 709/245; 709/250

(58) Field of Classification Search .......... 370/401, 370/331–334, 338, 400, 216–228; 726/5–7; 709/228, 250, 221, 245; 725/25; 26/5–7
See application file for complete search history.

(56) References Cited

U.S. PATENT DOCUMENTS

| | | | |
|---|---|---|---|
| 6,591,306 B1 | 7/2003 | Redlich | |
| 6,954,790 B2 | 10/2005 | Forslow | |
| 7,080,116 B2 | 7/2006 | Purpura | |
| 7,499,438 B2 * | 3/2009 | Hinman et al. | 370/338 |
| 2002/0037075 A1 | 3/2002 | Flanagan | |
| 2004/0044789 A1 | 3/2004 | Angel et al. | |
| 2004/0083128 A1 | 4/2004 | Buckingham et al. | |
| 2005/0041602 A1 | 2/2005 | West et al. | |
| 2005/0048962 A1 | 3/2005 | Wan et al. | |
| 2005/0198319 A1 | 9/2005 | Chan et al. | |
| 2005/0198534 A1 | 9/2005 | Matta et al. | |
| 2006/0187890 A1 * | 8/2006 | Lin | 370/338 |
| 2007/0021052 A1 | 1/2007 | Boice | |
| 2008/0046561 A1 * | 2/2008 | Pham et al. | 709/224 |
| 2008/0134290 A1 * | 6/2008 | Olsson | 726/3 |
| 2008/0250478 A1 * | 10/2008 | Miller et al. | 726/5 |

OTHER PUBLICATIONS

Aruba, "WLAN Secure Guest Access", http://www.arubanetworks.com/pdf/technology/DG_WLAN_Sedcure_ArubaOS25.pdf, pp. 1-43.2006.*
http://www.linksys.com/servlet/Satellite?c=L_Product_C2&childpagename=US%2FLayout&cid=1115416856028&pagename=Linksy%2FCommon%2FVisitorWrapper&lid=26028397089B20, Apr. 30, 2007.

* cited by examiner

*Primary Examiner* — Vivek Srivastava
*Assistant Examiner* — Hee Song

(57) ABSTRACT

The present disclosure generally pertains to routers for providing guest access to networks. An integrated router in one exemplary embodiment comprises at least one local area network (LAN) interface, memory, and routing logic. The memory is configured to store security data. The routing logic is configured to enable a first LAN and to authenticate a user for accessing the first LAN based on the security data. The routing logic is configured to enable a second LAN in response to user input and to automatically disable the second LAN upon expiration of a specified time period. The routing logic is further configured to route messages communicated between a device of the second LAN and a wide area network (WAN) and to route messages through the first LAN.

20 Claims, 7 Drawing Sheets

NETWORK SYSTEMS AND METHODS FOR PROVIDING GUEST ACCESS

RELATED ART

Local area networks (LANs), including wireless local area networks (WLANs), are becoming more prevalent both in residential and commercial environments. In a LAN, at least one router is usually employed to route messages among various devices, such as personal computers, printers, fax machines, etc., of the LAN. The router is also often communicatively coupled to a wide area network (WAN), such as the Internet, and can route messages to and from the WAN. Thus, devices of the LAN can usually communicate with the WAN through the router.

In some situations, it may be desirable to provide a guest with temporary access to the WAN using resources, such as a router and/or a computer, of the LAN. For example, a guest may visit the home of a user who has a LAN for personal use, and such guest may desire to access the Internet or other WAN for a limited time. In another context, a customer or other type of guest may visit a user's office or place of business and desire to access the Internet or other WAN while there. In such situations, the user may wish to provide the guest with access to the Internet or other WAN without jeopardizing the security of his or her LAN. However, achieving such a goal can be burdensome and/or problematic.

In this regard, the user can temporarily disable security features implemented by the LAN router, but such a technique exposes the LAN to increased security vulnerabilities while the security features are disabled. Further, the user may forget to enable the security features after the guest no longer desires access to the WAN. As an alternative, the user could set up an account for the guest or provide the user with a security key, password, or passphrase so that the guest can access the LAN as an authorized user without changing many of the security settings for the LAN. However, such techniques can be burdensome. Further, in situations where the guest is to be granted only temporary access, the user may desire to disable the account or change the security key, password, or passphrase after the guest's use, thereby increasing the burden to the user.

Thus, when a guest desires to temporarily use the resources of a LAN, a user is often faced with undesirable alternatives. In this regard, the user can choose to deny the guest's request or to grant the guest's request possibly incurring various burdens and/or security risks as a result.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for providing guest access to networks. A system in accordance with an exemplary embodiment of the present disclosure comprises a local area network (LAN) router that is configured to route messages through a plurality of LANs. One of the LANs, referred to hereafter as "guest LAN," is accessible by guests. For example, the guest LAN may be used to provide guests with access to a wide area network (WAN), such as the Internet, through the LAN's router. Another of the LANs, referred to as the "user LAN," is separate from the guest LAN, and a guest having access to the guest LAN does not have permission to directly access the user LAN. Thus, while the guest is accessing the WAN through the guest LAN, the resources of the user LAN remain protected. Indeed, since the security features of the user LAN do not need to be changed in order to provide the guest with access to the WAN, the guest access does not create vulnerabilities that can be exploited by malicious third parties to attack the user LAN.

In at least one exemplary embodiment, a guest's access to the guest LAN is only temporary. In this regard, the security settings for the guest LAN are such that the guest's access is automatically terminated after a specified time period. In one embodiment, the time period is specified via a hardware switch, which provides a convenient way for a user to provide such input. In other embodiments, other techniques for setting the desired time period for guest access may be implemented.

Figure 1:
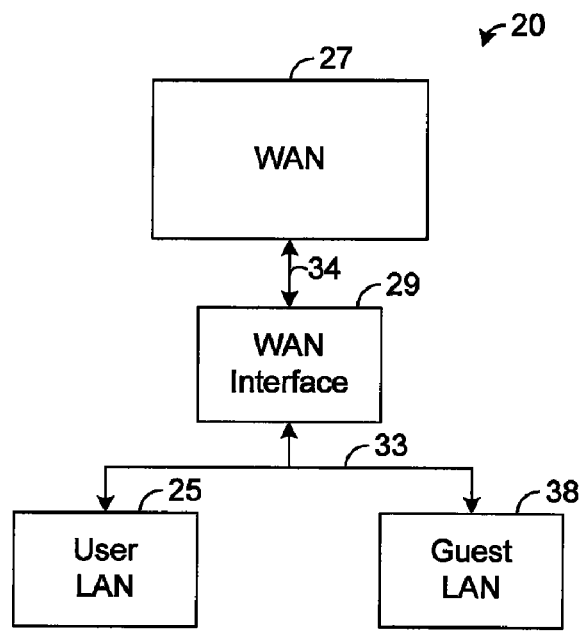
FIG. 1 is a block diagram illustrating an exemplary embodiment of a communication system.

FIG. 1 depicts a communication system 20 in accordance with an exemplary embodiment of the present disclosure. As shown by FIG. 1, the system 20 comprises a LAN 25, which will be referred to hereafter as "user LAN 25." The user LAN 25 is communicatively coupled to a WAN 27, such as the Internet, through a WAN interface 29. As an example, the WAN interface 29 may comprise a modem, such as a cable modem, digital subscriber line (DSL) modem or other type of modem or communication device, that is communicatively coupled to the LAN 25 and WAN 27. The WAN interface 27 can be configured to communicate with the LAN 25 and WAN 27 via channels 33, 34, respectively, which can be wired and/or wireless.

The WAN interface 29 is also communicatively coupled to another LAN 38, which will be referred to hereafter as "guest LAN 38." In the embodiment depicted by FIG. 1, the same channel 33 is used for both LANs 25 and 38 in communicating with the WAN interface 29. However, in other embodiments, different channels may be used to communicate with the WAN interface 29, and/or multiple WAN interfaces may be employed.

Figure 2:
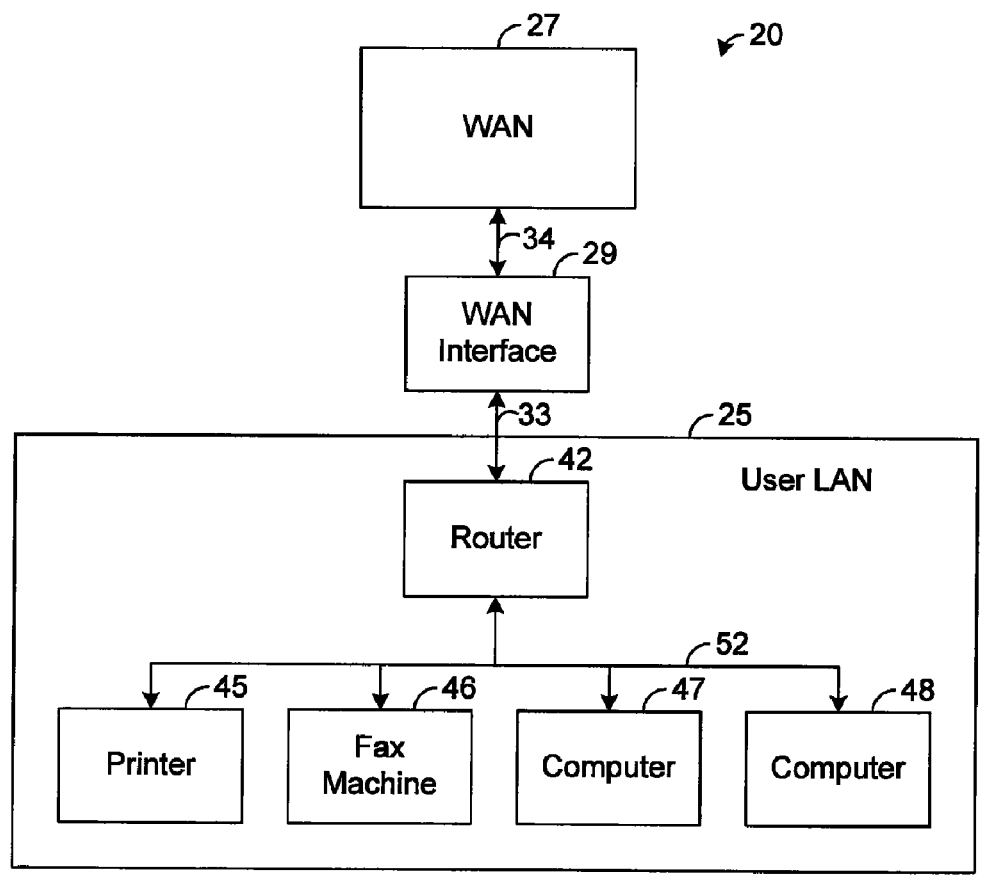
FIG. 2 is block diagram illustrating an exemplary embodiment of a user LAN, such as is depicted in FIG. 1.

In one exemplary embodiment, as shown by FIG. 2, the WAN interface 29 is communicatively coupled to a router 42 of the user LAN 25 via channel 33. The router 42 is communicatively coupled to other devices of the LAN 25. In this regard, in the embodiment depicted by FIG. 2, the router 42 is communicatively coupled to a printer 45, a fax machine 46, and a plurality of computers 47, 48. The computers 47, 48 can be any type of known or future-developed computer. For example, either of the computers 47, 48 can be a personal computer (PC) or other type of computer, including a desktop computer, a lap-top computer, or a hand-held computer, such as a personal digital assistant (PDA). In other embodiments, the LAN 25 may comprise other numbers and other types of devices that are communicatively coupled to the router 42.

In one exemplary embodiment, the LAN 25 is a wireless LAN (WLAN), and the router 42 is configured to communicate with the LAN devices 45-48 via wireless signals. However, the router 42 may be conductively coupled to any of the devices 45-48 and configured to communicate with any such device 45-48 via wired signals. In the embodiment depicted by FIG. 2, each of the devices 45-48 is configured to communicate with the router 42 via the same channel 52. For example, the router 42 may be configured to communicate with each of the devices 45-48 in the same frequency range. Further, each message may have an address, referred to as a "destination address," identifying the device that is to receive the message. Any type of known or future-developed protocol may be used for communication between the router 42 and devices 45-48.

As a mere example, a user may submit, via computer 47, a print request for printing a document. If the computer 47 is in direct communication with the printer 45, the computer 47 can send data to be printed directly to the printer 45. Alternatively, the computer 47 may define a message that includes data to be printed and a destination address identifying the printer 45. The computer 47 may transmit the message to the router 42, which routes the message to the printer 45. In this regard, the router transmits the message, including the destination address and data to be printed, via channel 52, and the printer 45 responds to the message based on the destination address. In the instant case, the printer 45 prints the data in the message.

In another example, the computer 47 may transmit a message destined for a device (not specifically shown) that is coupled to the WAN 27. In such an example, the computer 47 transmits the message, including a destination address identifying the message's intended destination, to the router 42, which based on the destination address routes the message to the WAN interface 29. The WAN interface 29 interfaces the message with the WAN 27, which routes the message to the appropriate destination.

The router 42 may receive, from the WAN interface 29, messages transmitted through the WAN 27 and destined for one of the LAN devices 45-48. The router 42 routes such messages to the appropriate destination device 45-48 based on the destination addresses included in the messages.

Figure 3:
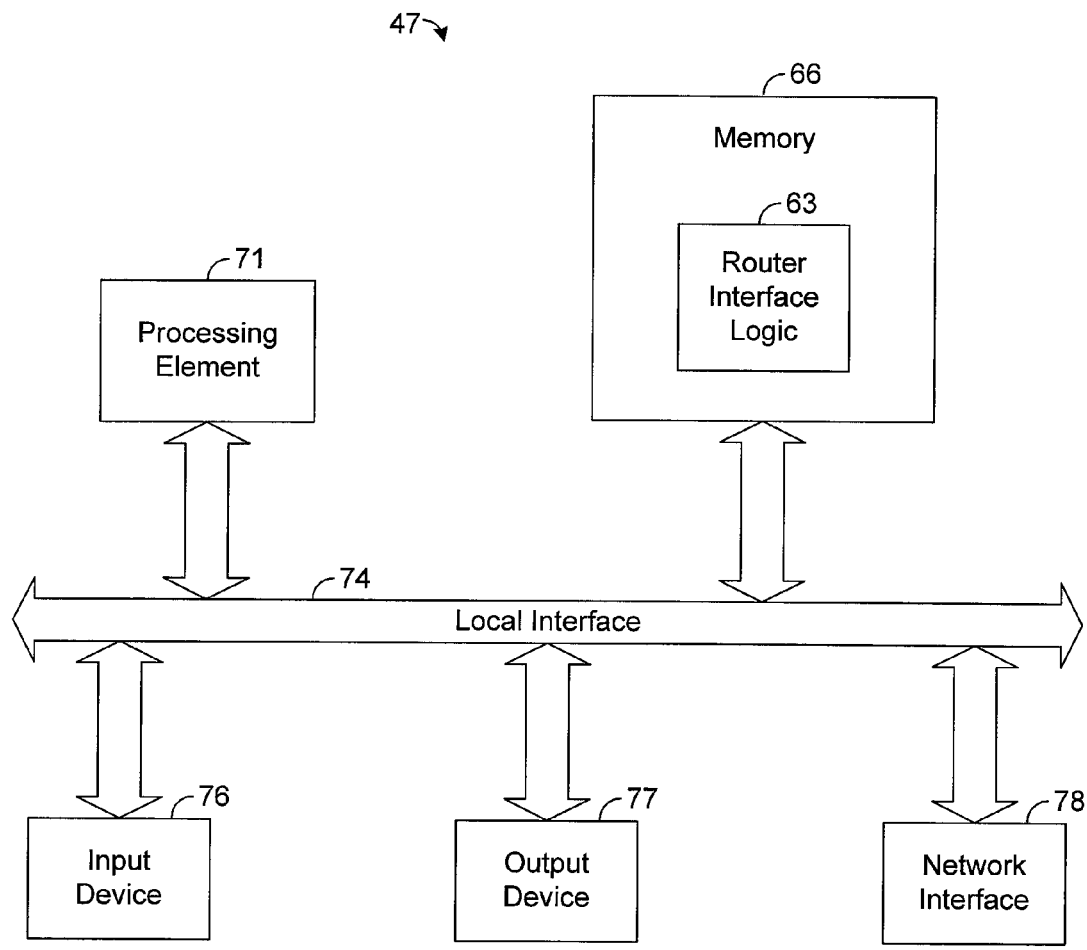
FIG. 3 is a block diagram illustrating an exemplary embodiment of a computer, such as is depicted in FIG. 2.

FIG. 3 depicts an exemplary embodiment of the computer 47. The computer 47 includes router interface logic 63 that is configured to drive communication with the router 42, as well as perform other functions related to the router 42, as will be described in more detail hereafter. The router interface logic 63 may be implemented in hardware, software, or a combination thereof. In the exemplary embodiment depicted by FIG. 3, the router interface logic 63 is implemented in software and stored in memory 66.

Note that the router interface logic 63, when implemented in software, can be stored and transported on any computer-readable medium for use by or in connection with an instruction execution device that can fetch and execute instructions. In the context of this document, a "computer-readable medium" can be any means that can contain, store, communicate, propagate, or transport a program for use by or in connection with the instruction execution device.

The exemplary embodiment of the computer 47 depicted by FIG. 3 comprises at least one conventional processing element 71, such as a digital signal processor (DSP) or a central processing unit (CPU), that communicates to and drives the other elements within the computer 47 via a local interface 74, which can include at least one bus. Furthermore, an input device 76, for example, a keyboard or a mouse, can be used to input data from a user of the computer 47, and an output device 77, for example, a printer or video monitor, can be used to output data to the user. The computer 47 also has a network interface 78 for enabling communication with the router 42. For example, the network interface may comprise a radio (not specifically shown in FIG. 3) for communicating wireless signals, such as radio frequency (RF) signals, with the router 42. In other embodiments, other types of signals may be communicated with the router 42.

Figure 4:
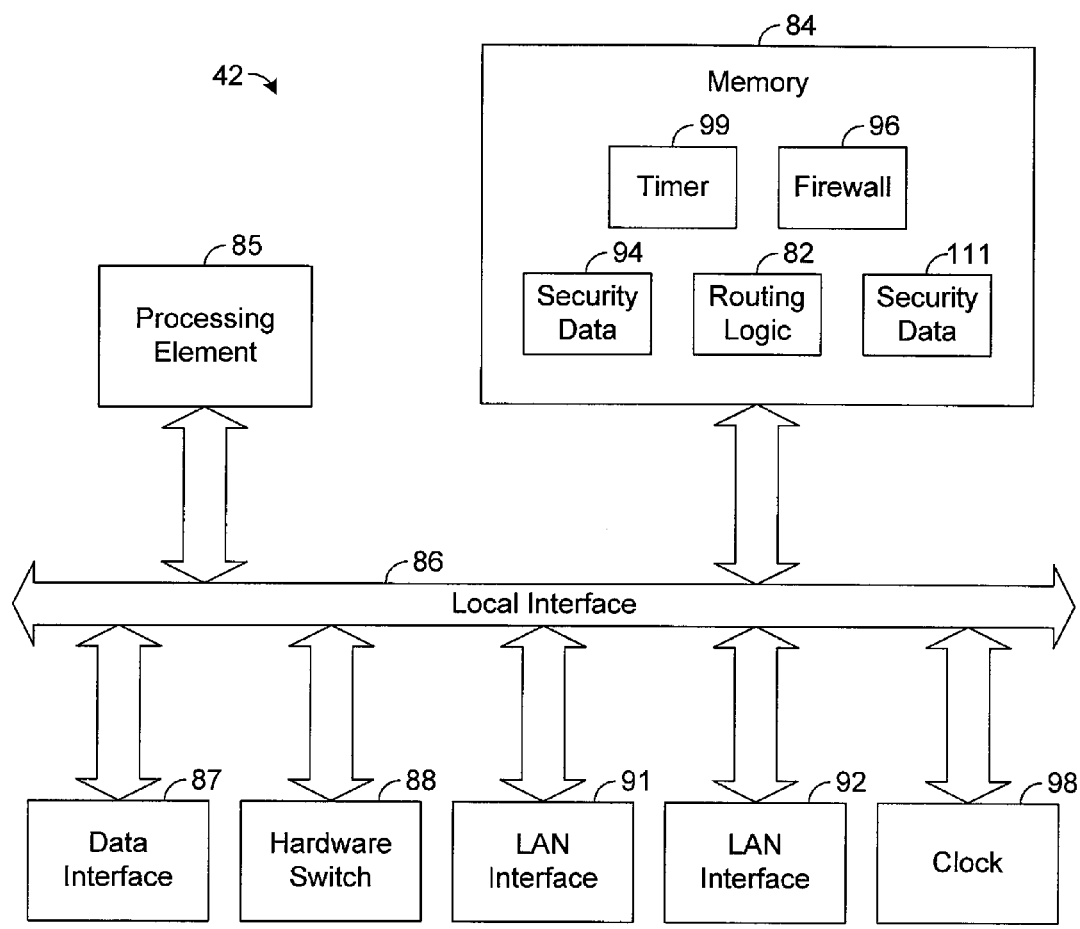
FIG. 4 is a block diagram illustrating an exemplary embodiment of a router, such as is depicted in FIG. 2.

FIG. 4 depicts an exemplary embodiment of the router 42. The router 42 comprises routing logic 82 for generally controlling the operation of the router 42, as will be described in more detail hereafter. The routing logic 82 may be implemented in hardware, software, or a combination thereof. In the exemplary embodiment depicted by FIG. 4, the routing logic 82 is implemented in software and stored in memory 84. When implemented in software, the routing logic 82 can be stored and transported on any computer-readable medium for use by or in connection with an instruction execution device that can fetch and execute instructions.

The exemplary embodiment of the router 42 depicted by FIG. 4 comprises at least one conventional processing element 85, such as a digital signal processor (DSP) or a central processing unit (CPU), that communicates to and drives the other elements within the router 42 via a local interface 86, which can include at least one bus. The router 42 comprises a data interface 87 for enabling communication with the WAN interface 29 (FIG. 2). As a mere example, the data interface 87 may comprise an RJ45 port for enabling digital communication with the WAN interface 29. However, other types of communication and interfaces may be implemented in other embodiments.

The router 42 also comprises a hardware switch 88, such as a button, a toggle, or a dial, for example, to enable various user inputs, as will be described in more detail hereafter. As shown by FIG. 4, the router 42 comprises a LAN interface 91 for enabling communication with other devices 45-48 of the user LAN 25 (FIG. 1). In one exemplary embodiment, the LAN interface 91 comprises a radio (not specifically shown in FIG. 4) for communicating wireless signals, such as RF signals, with the devices 45-48. However, in other embodiments, other types of signals may be communicated by the LAN interface 91.

The router 42 further comprises another LAN interface 92 for enabling communication with other devices of the guest LAN 38 (FIG. 1). In one exemplary embodiment, the LAN interface 92 comprises a radio (not specifically shown in FIG. 4) for communicating wireless signals, such as RF signals, with various devices of the guest LAN 38. However, in other embodiments, other types of signals may be communicated by the LAN interface 92.

The router 42 also comprises a timer 99, which can be implemented in hardware, software, or a combination thereof. In the embodiment depicted by FIG. 4, the timer 99 is implemented in software and stored in memory 84. The timer 99 tracks time based on a clock 98 and is configured to notify the routing logic 82 when various time periods expire, as will be described in more detail hereafter. In this regard, the routing logic 82 "sets" the timer 94 by providing it with data indicative of when the routing logic 82 is to be notified by the timer 99. Accordingly, a time period is defined such that the routing logic 82 is notified at the expiration of such time period. The timer 99 then monitors the clock 92 to determine when the time period expires and notifies the routing logic 82 of expiration of the time period. As an example, the timer 99 may generate an interrupt upon expiration of the time period. When the timer 99 notifies the routing logic 82 of expiration of a tracked time period, such event shall be referred to hereafter as "expiration of the timer 99."

In addition to the switch 88, the router 42 may comprise other user input or output devices, such as a keypad or a display (e.g., a liquid crystal display (LCD)). However, in one exemplary embodiment, the router 42 is not equipped with such user input/output (I/O) devices in an effort to reduce the overall cost of the router 42. Instead, a user is allowed to submit inputs and receive outputs via the router interface logic 63 of the computer 47, and such other user inputs and outputs are communicated between the computer 47 and the router 42.

As an example, a set of security data 94 may be stored in the router 42, as shown by FIG. 4, and a user may use the computer 47 to establish and/or change such data 94. The security data 94 defines various security parameters for the LAN 25, such as security keys, passwords, or information indicating which users have permission to access resources of the LAN 25 and, in particular, the devices 45-48 of the LAN 25. As used herein, the term "authentication parameter" shall be used to refer to any type of information, such as a username, a password, a passphrase, a security key, or a fingerprint, for example, that may be used to authenticate a user.

In one exemplary embodiment, an administrator establishes the security settings of the LAN 25 via computer 47. In this regard, the router interface logic 63 (FIG. 3) displays, via output device 77, a graphical user interface (GUI) that displays various security options, and the administrator may select the security options that he or she desires to implement. For example, the administrator may establish various authentication parameters to be used to authenticate users of the LAN 25. The router interface logic 63 transmits information indicative of the security settings defined by the administrator to the router 42 via network interface 78. The routing logic 82 then establishes or modifies the security data 94 as appropriate such that the desired security rules are implemented. For example, the routing logic 82 may be configured to deny access to the LAN 25 unless a valid password, passphrase, or security key is provided by a user attempting to access the LAN 25 via the router 42.

For example, when a user attempts to log-in via computer 47, the router interface logic 63 may display a GUI prompting the user to enter a password. The router interface logic 63 may then transmit any password entered by the user via input device 76 to the router 42 via network interface 78. The routing logic 82 may then compare the entered password to the user's predefined password in the security data 94. If the passwords match, the routing logic 82 transmits, via LAN interface 91, a message that indicates the user is authorized to access the LAN 25. Thereafter, the user may access the various resources of the LAN 25, including using the router 42 to access the WAN 27 or any of the resources of the LAN 25 accessible to the user, as indicated by the security data 94. Further, the routing logic 82 may transmit information about any of the resources of the LAN 25 accessible to the user, as indicated by the security data 94, so that the user can discover the state of these resources and, if desired, use or communicate with these resources.

However, if the compared passwords do not match, then the routing logic 82 instead transmits a message indicating that the user is not authorized to access the LAN 25. Until the user is able to provide a valid password, the user may not access the resources of the LAN 25 through the router 42 and, in particular, may not use the router 42 to access the WAN 27 or any other of the resources of the LAN 25. Protecting the resources of a LAN via various security measures is generally well-known, and the security data 94 may define any known or future-developed security rule for protecting network resources. Authentication of users via password comparisons is merely one exemplary security rule that may be defined by the security data 94.

The router 42 may also comprise a firewall 96 (FIG. 4) for protecting the resources of the LAN 25 from attacks passing through the WAN 27. In this regard, messages received from the WAN interface 29 are analyzed by the firewall 96 based on a set of security rules defined by the firewall 96. For example, the firewall 96 may be configured to filter the messages to remove viruses and/or other harmful or unauthorized message components or messages. The use of a firewall to protect computing resources is generally well-known, and any known or future-developed firewall may be employed.

Figure 5:
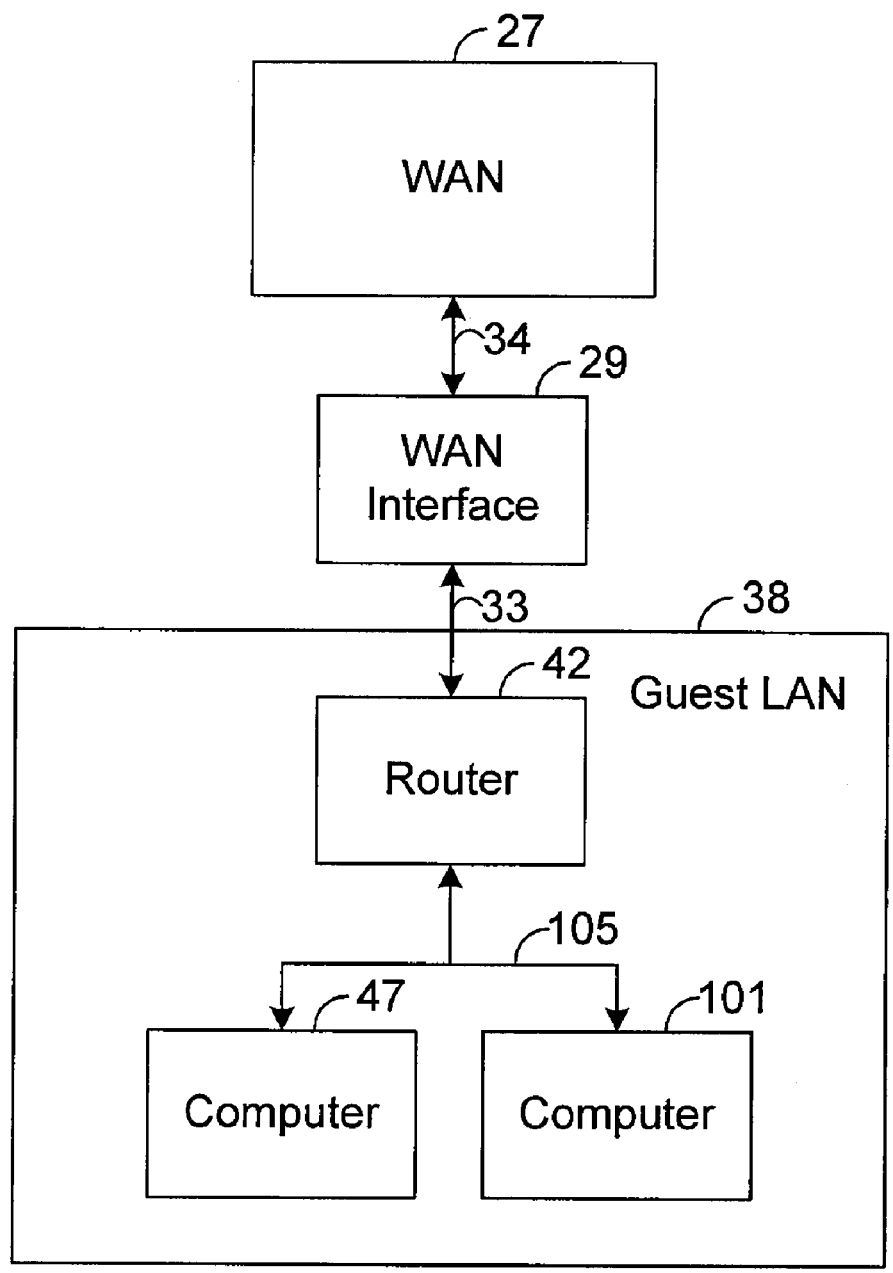
FIG. 5 is a block diagram illustrating an exemplary embodiment of a guest LAN, such as is depicted in FIG. 1.

As shown by FIG. 5, resources of the guest LAN 38 may use the router 42 to communicate with the WAN 27 similar to the way resources of the LAN 25 may use the router 42 to communicate with the WAN 27. In the exemplary embodiment shown by FIG. 5, the computer 47, which is a resource of the user LAN 25, is also a resource of the guest LAN 38, although in other embodiments, the computer 47 may be a resource of only one of the LANs 25, 38. Further, the guest LAN 38 may have other resources communicatively coupled to the router 42 either permanently or temporarily. For example, FIG. 5 shows a guest computer 101 (e.g., a lap-top computer) communicatively coupled to the router 42.

A channel 105 different than channel 52 (FIG. 4) is used by the resources of the guest LAN 38. In one exemplary embodiment, the channels 52 and 105 are both wireless but at different frequencies. However, it is possible for the resources of both LANs 25, 38 to use the same frequency and/or transmission medium for communication with the router 42, if desired.

Messages to be transmitted from either LAN 25 or 38 through the WAN 27 are transmitted to the router 42 via channel 52 or 105. Based on the destination addresses of such messages, the router 42 routes these messages to the WAN interface 29 via channel 33. Further, messages from the WAN 27 and destined for a resource of the guest LAN 38 are routed by the router 42 to such resource. Note that a single resource, such as computer 47, may have different addresses. In this regard, the computer 47 may have one address for use as a resource of LAN 25 and another address for use as a resource of LAN 38.

As shown by FIG. 4, the router 42 stores a set of security data 111 for defining the security rules for the guest LAN 38 similar to how the security data 94 defines security rules for the user LAN 25. For example, the security data 111 may define an authentication parameter for controlling access to the guest LAN 38. However, a guest using the LAN 38 is unable to directly access resources of the user LAN 25 via the router 42. For example, in one embodiment, the computer 48, fax machine 46, and printer 45 are resources of the user LAN 25 but not guest LAN 38. Thus, a guest may not use the guest LAN 38 and, in particular, the router 42 to directly access these resources. In this regard, since the security data 111 does not indicate that a user may access the foregoing components of LAN 25, the routing logic 82 refrains from providing direct access to these components through the LAN 38. It may be possible, however, to communicate with any of the components of the LAN 25 via messages transmitted from the LAN 38 through the WAN 27. For example, a message may be transmitted by computer 101 via channel 105 to router 42, which routes the message through the channel 33 to the WAN interface 29. Such message may then be transmitted through the WAN 27 and back to the router 42 via the WAN interface 29, and the router 42 may route the message to a resource of the LAN 25, provided that the router 42 and the resource on the LAN 25 permit such access. Any such message may be analyzed and possibly filtered by the firewall 96, which is not typically used to analyze or filter information transmitted from one resource of the LAN 25 to another resource of the same LAN 25.

Note that, although the guest is authorized to use the guest LAN 38, the security data 111 for the guest LAN 38 may be protected from the guest (e.g., via password protection or otherwise) so that the guest cannot change the security settings of the LAN 38.

Figure 6:
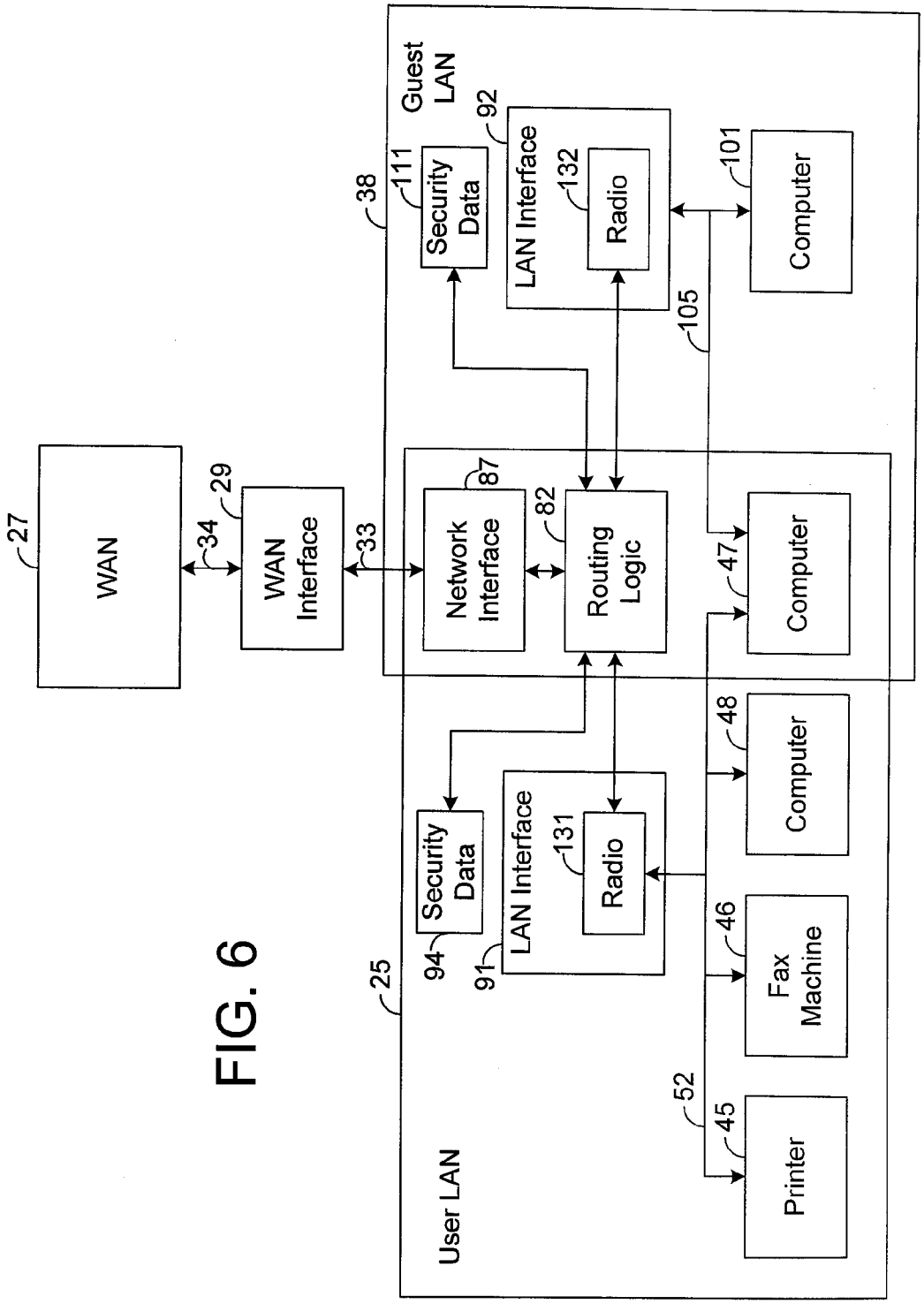
FIG. 6 is a block diagram illustrating an exemplary embodiment of a communication system.

FIG. 6 depicts both LANs 25, 38 of the system 20. As shown by FIG. 6, the security data 111, LAN interface 92, and guest computer 101 are dedicated to the guest LAN 38, and the computer 48, fax machine 46, printer 45, LAN interface 91, and security data 94 are dedicated to the user LAN 25. Further, the computer 47, routing logic 82, and data interface 87 are resources of both LANs 25, 38. In the embodiment shown by FIG. 6, the LAN interface 91 comprises a RF radio 131 to enable wireless communication between the router 42 and devices 45-48 via channel 33, and the LAN interface 92 comprises a RF radio 132 to enable wireless communication between the router 42 and devices 47, 101 via channel 105. In other embodiments, other types of devices may be used to implement either of the LAN interfaces 91, 92.

Although components of the router 42 may be used for both LANs 25, 38, such components are integral with one another in at least one embodiment such that all of the components of the integrated router 42 can be easily transported as a single unit thereby facilitating installation. In other embodiments, any of the components of the router 42 may be non-integral with respect to any other of the router components.

In one exemplary embodiment, the security rules implemented for the guest LAN 38 provide less security relative to the security rules implemented for the user LAN 25. For example, unlike the user LAN 25, the security rules defined by the security data 111 may be such that any user may access the LAN 38. Thus, if a guest desires to use the LAN 38 to access the WAN 27 or to perform some other function, there is no need for an administrator to establish any authentication parameters specifically for such guest. Moreover, any guest may use the LAN 38, and there is no need for such guest to enter a valid password, passphrase, security key, or other type of authentication parameter before access to the LAN 38 is provided. In another embodiment, the security data 111 defines an authentication parameter such that a guest must enter a valid password, passphrase, security key, fingerprint, or other authentication information, before access to the LAN 38 is permitted by the router 42. In such an embodiment, the same authentication parameter may be given to multiple guests so that a separate authentication parameter does not need to be established and remembered for each such guest. In either such exemplary embodiment, a new guest can be provided access to the LAN 38 without an administrator incurring the burdensome steps of establishing an authentication parameter specifically for such guest. In other embodiments, an administrator may establish different authentication parameters for different guests, if desired.

However, in any of the foregoing exemplary embodiments, the guest LAN 38 can be, at least to some extent, less secure than the user LAN 25. For example, if user authentication is not used for LAN 38, then any party that can gain access to the channel 105 will be recognized by the routing logic 82 as an authorized user of the LAN 38. Even if user authentication is implemented, a guest may permanently have a valid password, passphrase, security key, or other authentication parameter unless an administrator changes such authentication parameter after the guest uses the LAN 38. However, regardless of the configuration of the guest LAN 38, the user LAN 25 remains protected by the security rules defined by data 94 without creating additional vulnerabilities resulting from the guest's access of LAN 38.

To alleviate some of the security concerns for the guest LAN 38, access to the LAN 38 is provided only on a temporary basis. For example, a user of the LAN 25 may desire to provide a guest with temporary access to the WAN 27 for a limited period of time. In such an example, the user may allow the guest to access the router 42 via guest LAN 38 so that the guest can access the WAN 27. However, once the limited period of time expires, the LAN 38 is disabled so that no further access to the LAN 38 is provided until an authorized user again enables the LAN 38. When the LAN 38 is disabled, the routing logic 82 deactivates (e.g., puts to sleep or turns off) the LAN interface 92 so that no messages can be communicated with such interface 92. As a result, the routing logic 82 does not respond to any messages that attempt to use the LAN 38. The disabling of the LAN 38 at the expiration of the limited period of time may be performed automatically or may be performed in response to user input once the user has determined that no further access to the LAN 38 is to be provided.

Figure 7:
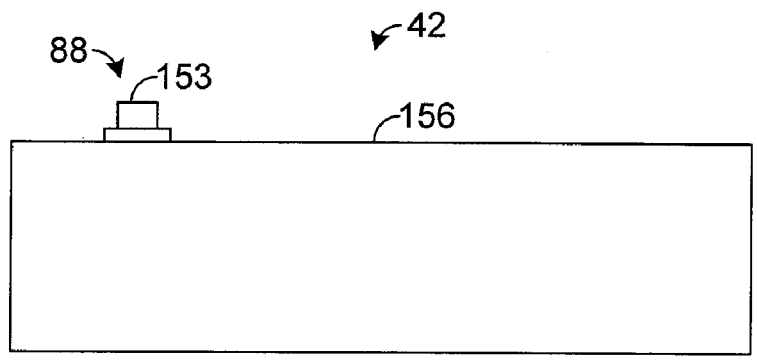
FIG. 7 is a side view of an exemplary embodiment of a router, such as is depicted in FIG. 6.
Figure 8:
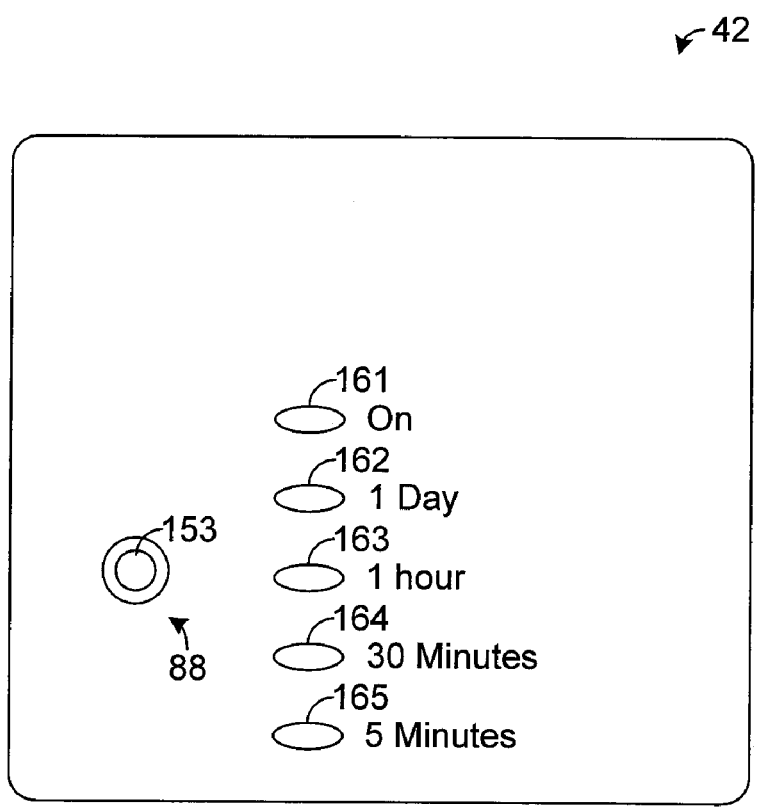
FIG. 8 is a top view of the router depicted in FIG. 7.

In one exemplary embodiment, inputs for controlling when the LAN 38 is enabled and disabled are provided directly to the router 42 via the hardware switch 88 (FIG. 4). FIGS. 7 and 8 depict an exemplary router 42 for such an embodiment. In the embodiment depicted by FIGS. 7 and 8, the hardware switch 88 is implemented as a button 153. In this regard, various components of the router 42, such as the memory 84, processing element 85, and interfaces 87, 88, 91, 92 are housed by a housing unit 156 that covers such components. Mounted on, passing through, or exposed by the housing unit 156 are the button 153 and a plurality of light indicators 161-165, such as light emitting diodes (LEDs).

In the instant embodiment, activation of the switch 88 occurs by a user pressing the button 153. If the guest LAN 38 is currently disabled when a user activates the switch 88, then the routing logic 82 is configured to enable the LAN 38. In this regard, the routing logic 82 wakes the LAN interface 92 and processes (e.g., routes) messages received from the resources of the LAN 38. At some point, the routing logic 82 disables the LAN 38 either automatically or in response to a user input. Exemplary techniques for enabling and disabling the LAN 38 will be described below.

In this regard, if the user activates the switch 88 once (e.g., presses the button 153) while the guest LAN 38 is disabled, then the routing logic 82 enables the LAN 38 and activates the light indicator 161 such that it is illuminated thereby indicating that the LAN 38 is enabled. In such a state, the routing logic 82 keeps the LAN 38 enabled until another input is received via switch 88.

If the user activates the switch 88 twice rather than once, then the routing logic 82 enables the LAN 38 but only for a predefined time period. In this regard, the routing logic 82 sets the timer 99 for expiration in twenty-four hours. The logic 63 also activates the light indicator 162 such that it is illuminated thereby indicating that the LAN 38 is enabled for a period of twenty-four hours or, in other words, one day as specified by the user. Once the timer 99 expires (i.e., after twenty-four hours in the instant example), the timer 99 notifies the routing logic 82 of such expiration, and the logic 63 automatically disables the LAN 38. Upon disabling the LAN 38, the routing logic 82 ensures that each indicator 161-165 is deactivated thereby indicating that the LAN 38 is disabled.

If the user activates the switch 88 three times rather than once or twice, then the routing logic 82 enables the LAN 38 but only for a predefined time period. In this regard, the routing logic 82 sets the timer 99 for expiration in one hour. The logic 63 also activates the light indicator 163 such that it is illuminated thereby indicating that the LAN 38 is enabled for a period of one hour as specified by the user. Once the timer 99 expires (i.e., after one hour in the instant example), the timer 99 notifies the routing logic 82 of such expiration, and the logic 63 automatically disables the LAN 38. Upon disabling the LAN 38, the routing logic 82 ensures that each indicator 161-165 is deactivated thereby indicating that the LAN 38 is disabled.

If the user activates the switch 88 four times rather than one, two, or three times, then the routing logic 82 enables the LAN 38 but only for a predefined time period. In this regard, the routing logic 82 sets the timer 99 for expiration in thirty minutes. The logic 63 also activates the light indicator 164 such that it is illuminated thereby indicating that the LAN 38 is enabled for a period of thirty minutes as specified by the user. Once the timer 99 expires (i.e., after thirty minutes in the instant example), the timer 99 notifies the routing logic 82 of such expiration, and the logic 63 automatically disables the LAN 38. Upon disabling the LAN 38, the routing logic 82 ensures that each indicator 161-165 is deactivated thereby indicating that the LAN 38 is disabled.

If the user activates the switch 88 five times rather than one, two, three, or four times, then the routing logic 82 enables the LAN 38 but only for a predefined time period. In this regard, the routing logic 82 sets the timer 99 for expiration in five minutes. The logic 63 also activates the light indicator 165 such that it is illuminated thereby indicating that the LAN 38 is enabled for a period of five minutes as specified by the user. Once the timer 99 expires (i.e., after five minutes in the instant example), the timer 99 notifies the routing logic 82 of such expiration, and the logic 63 automatically disables the LAN 38. Upon disabling the LAN 38, the routing logic 82 ensures that each indicator 161-165 is deactivated thereby indicating that the LAN 38 is disabled.

In one exemplary embodiment, the states of the indicators 161-165 change as time elapses to indicate the amount of timing remaining before the LAN 38 is to be disabled. For example, if the timer 99 is set to twenty-four hours in response to two activations of the switch 88, then the indicator 162 is illuminated as described above. However, after twenty-three hours elapse such that there is only one hour remaining (i.e., the same amount of time that would have been enabled had one more activation of the switch 88 occurred), the routing logic 82 deactivates the indicator 162 and activates indicator 163 to indicate that only one hour remains before expiration of the timer 99. Similarly, the indicator 164 is activated (and indicator 163 deactivated) when only thirty minutes remain before expiration of timer 99, and the indicator 165 is activated (and indicator 164 deactivated) when only five minutes remain before expiration of timer 99. Thus, a user can look at which indicator 161-165 is illuminated to get a sense of whether the LAN 38 is enabled and, if so, about how long it will remain enabled.

For example, if indicator 161 is activated, then a user is aware that the LAN 38 is activated and will remain so until another user input is received. If indicator 162 is activated, then a user is aware that the amount of time remaining before expiration of timer 99 and, therefore, disablement of the LAN 38 is between one hour and twenty-four hours depending on the amount of time that has elapsed since the most recent setting of the timer 99. If indicator 163 is activated, then a user is aware that the amount of time remaining before expiration of timer 99 and, therefore, disablement of the LAN 38 is between one hour and thirty minutes. If indicator 164 is activated, then a user is aware that the amount of time remaining before expiration of timer 99 and, therefore, disablement of the LAN 38 is between thirty minutes and five minutes. Finally, if indicator 165 is activated, then a user knows that the amount of time remaining before expiration of timer 99 and, therefore, disablement of the LAN 38 is less than five minutes.

Note that a user may change the amount of time remaining before expiration of the timer 99 by activating the switch 88. For example, assume that a guest comes to stay at a user's house for a week. The user may activate the switch 88 once such that the LAN 38 is enabled without setting the timer 99 and such that indicator 161 is illuminated. Thus, the guest is able to use LAN 38 at any time while the router 42 remains in this state. The day before the expected departure of the guest, the user may activate the switch 88 such that the state of the router 42 is changed. In this regard, activation of the switch 88 causes the routing logic 82 to set the timer 99 to twenty-four hours and activate the indicator 162. Thus, at the expiration of the twenty-four hours period, the routing logic 82 will automatically disable the LAN 38. However, assume that just after changing the state of the router 42, the guest announces that he will be leaving in about forty-five minutes due to an unexpected event. At this time, the user may activate the switch 88 again such that the timer 99 is reset to one hour and the indicator 163 is activated. Thus, the timer 99 will now expire in one hour at which time the routing logic 82 will automatically disable the LAN 38.

In addition, a user may immediately disable the LAN 38 at any time by activating the switch 88 a sufficient number of times. In this regard, the user may continue activating the switch 88 until the last state of enablement is reached. In the current example, the last state is when there is less than five minutes remaining before expiration of the timer 99 (i.e., when indicator 165 is activated). If the user activates the switch 88 while in this last state, the routing logic 82 immediately disables the LAN 38 and ensures that each indicator 161-165 is deactivated.

It should be noted that other techniques for controlling whether the LAN 38 is enabled are possible in other embodiments. In addition, other types of devices other than the button 153 and indictors 161-165 described above may be used for user input and output. Indeed, the configuration described above with reference to FIGS. 7 and 8 is exemplary, and other configurations are possible.

As a mere example, a user may be allowed to set the time of day (e.g., 8:00 p.m.) when the guest LAN 38 is to be disabled. In another embodiment, once the guest LAN 38 is enabled, the routing logic 82 may be configured to monitor use of the LAN 38 to determine when it is to be disabled. For example, the routing logic 82 may be configured to disable the LAN 38 after a specified time of inactivity. In this regard, if the router 42 does not receive a message to be routed through the LAN 38 for a specified period of time, it may be assumed that the guest is no longer using the LAN 38, and the routing logic 82 may be configured to disable the LAN 38. Other techniques for controlling when the guest LAN 38 is enable or disabled are possible in other embodiments.

Further, it is possible to employ a software switch rather than the hardware switch 88 described above. In one exemplary embodiment, a software switch is implemented via the router interface logic 63 (FIG. 3). In this regard, the router interface logic 63 may display a GUI for allowing the user to indicate when the LAN 38 is to be enabled and disabled. The input may indicate the duration that the LAN 38 is to be enabled. The router interface logic 63 may transmit information indicative of such inputs to the router 42, and the routing logic 82 may then enable or disable the LAN 38 based on such inputs. In such an embodiment, the routing logic 82 may be configured to disable the LAN 38 without deactivating the LAN interface 92 so that this interface 92 can still receive messages, such as messages requesting enablement of the LAN 38. In such an embodiment, the routing logic 82 may ignore messages received by the LAN interface 92 except for messages from the router interface logic 63 indicating that the LAN 38 is to be enabled. In such an embodiment, it may be desirable to ensure that the sender of such messages is authenticated before enabling the guest LAN 38. In another embodiment, it is possible for the routing logic 82 to deactivate the LAN interface 92 when the LAN 38 is disabled and to listen for messages to enable the LAN 38 from the LAN interface 91. In such an embodiment, the router interface logic 63 may be configured to transmit such messages via the channel 52 of the user LAN 25.

In various embodiments described above, two separate LAN interfaces 91, 92 are described. However, it is possible for only a single LAN interface to be used for both LANs 25, 38. For example, a single RF radio may be used by the router 42 to communicate with the resources of both LANs 25, 38. In addition, any number of user LANs 25 and guest LANs 38 may be employed by the communication system 20.

It should be noted that it may be desirable for some type of security measures to be used for the enablement of the guest LAN 38. For example, if a software switch is used to enable the guest LAN 38, then the routing logic 82 may be configured to allow only certain users (e.g., an administrator) to activate the guest LAN 38. If a hardware switch 88 is used to enable the guest LAN 38, as described herein for several embodiments, then it may be desirable to keep the router 42 in a safe location accessible only by those authorized to enable the guest LAN 38. For example, the router 42 may be kept in a locked room or building. In addition, the router 42 may employ some type of hardware security interface (not shown) for protecting enablement of the guest LAN 38.

For example, the router 42 may have a lock (not shown) that receives a key and is activated by the key. For example, the lock, like locks on many doors, may receive a key and can be activated by manually turning the key while it is inserted into the lock. Further, the routing logic 82 may be configured to receive and act on inputs from the hardware switch 88 only when the lock is activated by a matching key. Thus, only users with a key matching the lock can enable the guest LAN 38. In another example, the router 82 may have a keypad or other user input device that allows a user to submit inputs. The routing logic 82 may be configured to receive and act on inputs from the hardware switch 88 only within a short time period (e.g., a few seconds) after a user has entered a valid password via the keypad or other user input device. Accordingly, only users with a valid password may use the switch 88 to enable the guest LAN 38. In other embodiments, other techniques for protecting enablement of the guest LAN 38 are possible.

An exemplary use and operation of the system 20 will now be described below with particular reference to FIG. 9.

For illustrative purposes, assume that a user has the LAN 25 implemented at his or her home. Further assume that a guest comes to stay at the user's home to spend the night and that the guest asks to use the computer 47 to access the WAN 27. Rather than giving the guest access to the WAN 27 via the user's home LAN 25, the user instead decides to give the guest access to the WAN 27 via guest LAN 38. Thus, the user goes to the router 42 and presses the button 153 twice while the router 42 is activated. As used herein, the router 42 is "activated" when it is powered-up and running such that it can receive and process inputs.

Figure 9:
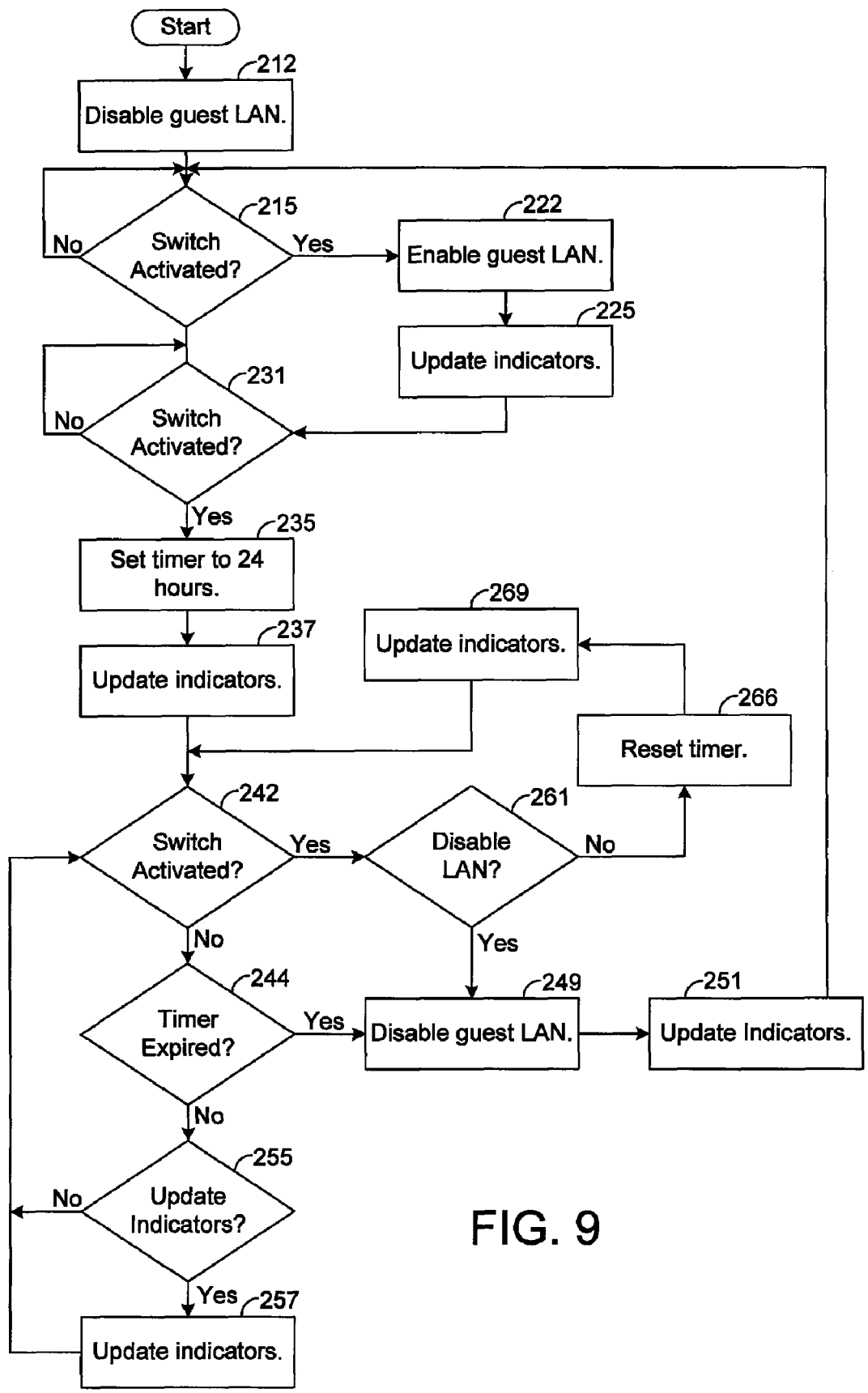
FIG. 9 is a flow chart illustrating an exemplary method for controlling a router, such as is depicted in FIG. 7.

Initially, the guest LAN 38 is disabled, as shown by block 212 of FIG. 9. Upon the first button press, the routing logic 82 makes a "yes" determination in block 215 and enables the LAN 38, as shown by block 222. In this regard, the routing logic 82 activates the LAN interface 92 and appropriately routes messages received by the interface 92 from the computer 47 and possibly other resources of the guest LAN 38. The routing logic 82 also activates the indicator 161 in block 225. In response to the second button press, the routing logic 82 makes a "yes" determination in block 231 and sets the timer 99 to twenty-four hours, as shown by block 235. The routing logic 82 also updates the indicators 161-165, as shown by block 237. In this regard, the routing logic 82 deactivates the indicator 161 and activates indicator 162 to indicate that the LAN 38 has been enabled for the next twenty-four hours.

Thereafter, the routing logic 82 determines in block 242 if the user again presses the button 153. In block 244, the routing logic 82 determines whether the timer 99 has expired. If no further button presses are received after block 231, then the timer 99 should expire twenty-four hours after performance of block 235. When the timer 99 does expire, the routing logic 82 disables the guest LAN 38, as shown by block 249. In particular, the routing logic 82 deactivates the LAN interface 92 and stops processing (e.g., routing) messages, if any, transmitted via LAN 38. In addition, the routing logic 82 updates the indicators 161-165 in block 251 to indicate that the LAN 38 is no longer enabled In block 255, the routing logic 82 determines whether the states of the indicators 161-165 are to be updated. In this regard, the indicators 161-165 may be updated to reflect the amount of time remaining until expiration of the timer 99 and, therefore, disablement of the LAN 38. For example, one hour before expiration of the timer 99, the routing logic 82 may be configured to make a "yes" determination in block 255, and update the indicators 161-165, in block 257, by deactivating indicator 162 and activating 163 to indicate that one hour or less remains until disablement of the LAN 38. The routing logic 82 may make similar updates to indicate when the amount of time remaining before expiration of timer 99 reaches thirty minutes and five minutes.

Assume that just a few minutes after performance of block 235, the guest announces that he or she needs to leave the user's home within the next hour. The user then presses the button 153 causing the routing logic 82 to make a "yes" determination in block 242. Thus, the routing logic 82 determines in block 261 whether the LAN 38 is to be disabled. In the instant embodiment, the routing logic 82 makes a "yes" determination in block 261 only if there is less than five minutes remaining before expiration of the timer 99 when a button press is detected in block 252. Thus, in the instant example, the routing makes a "no" determination in block 261 and resets the timer 99 in block 266. In this regard, the routing logic 82 sets the timer 99 to expire in one hour and updates the indicators 161-165 in block 269 such that the indicator 162 is deactivated and indicator 163 is activated.

Assuming that no further button presses are performed before expiration of the timer 99, the timer 99 should expire in one hour causing the routing logic 82 to automatically disable the guest LAN 38.

Once there is thirty minutes or less remaining on the timer 99, the routing logic 82, in block 257, updates the indicators 161-165 to activate the indicator 164 and deactivate the indicator 163. At this point, if another button press is detected in block 242, the routing logic 82 resets the timer 99 in block 266 to expire in five minutes, and the routing logic 82 updates the indicators 161-165 by activating indictor 165 and deactivating indicator 164. If yet another button press is detected in block 242, the routing logic 82 makes a "yes" determination in block 261 and disables the guest LAN 38 in block 249. The routing logic 82 then returns to block 215.

Accordingly, during the limited time period that the guest is at the user's home, the guest can access the WAN 27 via the guest LAN 38. Further, after the guest leaves the user's home, the routing logic 82 automatically disables the guest LAN 38 based on timer 99, or the routing logic 82 disables the guest LAN 38 in response to user input. Thus, the user is able to conveniently provide the guest with access to the WAN 27 through the guest LAN 38 without altering or jeopardizing the security of the user LAN 25. In addition, the potentially less secure guest LAN 38 remains enabled only for a limited time period so that if a malicious third party is able to exploit the guest LAN 38, such third party can do so for only a limited time and would be prevented from accessing any resources of the user LAN 25.

The invention claimed is:

1. An integrated router for providing guest access to wide area networks, the integrated router comprising:
at least one local area network (LAN) interface;
memory configured to store security data;
routing logic configured to enable a first LAN and to authenticate a user for accessing the first LAN based on the security data, the routing logic configured to enable a second LAN in response to user input and to automatically disable the second LAN upon expiration of a specified time period, the routing logic configured to route messages through the second LAN and communicated between a device of the second LAN and a wide area network (WAN), and to route messages through the first LAN; and
a hardware switch, wherein the user input is received via the hardware switch while the router is activated.

2. The router of claim 1, wherein the routing logic is configured to set an amount of the specified time period based on the user input, and disable the second LAN upon expiration of the amount of specified time period based on the user input.

3. The router of claim 1, further comprising a timer, wherein the routing logic is configured to set the timer to the specified time period, wherein the specified time period is based on the user input, and wherein disabling the second LAN comprises disabling access to the second LAN.

4. The router of claim 1, wherein the at least one LAN interface comprises:
a first radio configured to communicate with at least one device of the first LAN, wherein the routing logic is configured to enable and disable the first LAN via the first radio; and
a second radio configured to communicate with at least one device of the second LAN, wherein the routing logic is configured to enable and disable the second LAN via the second radio, and wherein disabling the second LAN comprises deactivating the second radio.

5. The router of claim 1, wherein the at least one LAN interface comprises at least one radio configured to communicate with at least one device of the first LAN via a first channel and to communicate with at least one device of the second LAN via a second channel, and wherein disabling the second LAN comprises deactivating the second channel so that no messages can be communicated with the second channel.

6. The router of claim 1, further comprising an indicator indicative of the specified time period, and wherein the specified time period is reduced in duration in response to a successive user input received via the hardware switch.

7. The router of claim 6, wherein the indicator comprises a light emitting diode.

8. The router of claim 1, wherein the hardware switch comprises a button.

9. The router of claim 1, wherein the routing logic configured to disable the second LAN comprises the routing logic configured to discontinue routing messages through the second LAN.

10. An integrated router for providing guest access to wide area networks, the integrated router comprising:
at least one local area network (LAN) interface;
a hardware switch;
memory configured to store security data; and
routing logic configured to enable a first LAN and to authenticate a user for accessing the first LAN based on the security data, the routing logic configured to enable a second LAN in response to activation of the hardware switch by a user while the router is activated, the routing logic configured to route messages through the second LAN including routing messages communicated between a device of the second LAN and a wide area network (WAN), and to route messages through the first LAN, and the routing logic configured to automatically disable the second LAN upon expiration of a specified time period after the activation of the hardware switch.

11. The router of claim 10, wherein the routing logic is configured to determine the specified time period when to disable the second LAN based on the hardware switch, and wherein automatically disabling the second LAN comprises the routing logic discontinuing routing messages through the second LAN.

12. The router of claim 10, further comprising a timer, wherein the routing logic is configured to set the timer based on the hardware switch, and wherein automatically disabling the second LAN comprises disabling access by users to the second LAN.

13. The router of claim 10, wherein the at least one LAN interface is configured to communicate with at least one device of the first LAN via a first wireless channel and to communicate with at least one device of the second LAN via a second wireless channel.

14. The router of claim 10, further comprising an indicator indicative of the specified time period, and wherein automatically disabling the second LAN comprises the routing logic not responding to any messages that attempt to use the second LAN.

15. The router of claim 10, wherein the at least one LAN interface comprises:
a first radio configured to communicate with at least one device of the first LAN, and wherein the routing logic is configured to enable and disable the first LAN via the first radio; and a second radio configured to communicate with at least one device of the second LAN, and wherein the routing logic is configured to enable and disable the second LAN via the second radio.

16. The router of claim 10, wherein the hardware switch is configured to receive the user input to enable the second LAN and the user input comprising:
   a first user input for the routing logic to provide the specified time period comprising a first specified time period; and
   a subsequent second user input for the routing logic to provide the specified time period comprising a second specified time period shorter in duration than the first specified time period.

17. A method for providing guest access to wide area networks, comprising:
   communicating with a wide area network (WAN) via an integrated router;
   routing, via the router, a first plurality of messages through a first local area network (LAN);
   routing, via the router, a second plurality of messages through a second LAN, the routing the second plurality of messages comprising routing at least one message communicated between a device of the second LAN and a WAN interface, wherein the second LAN is enabled through the router in response to user input received via a hardware switch of the router while the router is activated;
   authenticating a user for the first LAN based on security data stored in the router; and
   automatically disabling the second LAN upon expiration of a specified time period.

18. The method of claim 17, comprising indicating the specified time period, and wherein the specified time period is reduced in duration in response to a subsequent user input received via the hardware switch, and wherein disabling the second LAN comprises not providing any user access to the second LAN.

19. The method of claim 17, wherein the disabling the second LAN comprises the routing logic not responding to any messages that attempt to use the second LAN, and wherein the specified time period is based on the user input received via the hardware switch.

20. The method of claim 17, wherein:
   routing, via the router, the first plurality of messages through the first LAN comprises routing the first plurality of messages via a first radio of the router, the first radio configured to communicate with at least one device of the first LAN; and
   routing, via the router, the second plurality of messages through the second LAN comprises routing the second plurality of messages via a second radio of the router, the second radio configured to communicate with at least one device of the second LAN.

* * * * *

UNITED STATES PATENT AND TRADEMARK OFFICE
CERTIFICATE OF CORRECTION

PATENT NO. : 8,176,536 B2  
APPLICATION NO. : 11/742279  
DATED : May 8, 2012  
INVENTOR(S) : Stephane Belmon Page 1 of 1

It is certified that error appears in the above-identified patent and that said Letters Patent is hereby corrected as shown below:

In the Claims

Column 15, line 22, in Claim 17, after "LAN," delete "the".

Column 16, line 11, in Claim 19, after "wherein" delete "the".

Signed and Sealed this  
Eighteenth Day of March, 2014

Michelle K. Lee  
*Deputy Director of the United States Patent and Trademark Office*